Jan. 9, 1951

R. W. HERSH 2,537,758

INVENTORY CONTROL BUSINESS MACHINE

Filed June 18, 1949

INVENTOR.
ROBERT W. HERSH
BY
James C. Ledbetter
ATTORNEY.

Jan. 9, 1951 R. W. HERSH 2,537,758
INVENTORY CONTROL BUSINESS MACHINE
Filed June 18, 1949 9 Sheets-Sheet 2

INVENTOR.
ROBERT W. HERSH
BY James C. Ledbetter
ATTORNEY.

Jan. 9, 1951  R. W. HERSH  2,537,758
INVENTORY CONTROL BUSINESS MACHINE
Filed June 18, 1949  9 Sheets-Sheet 3
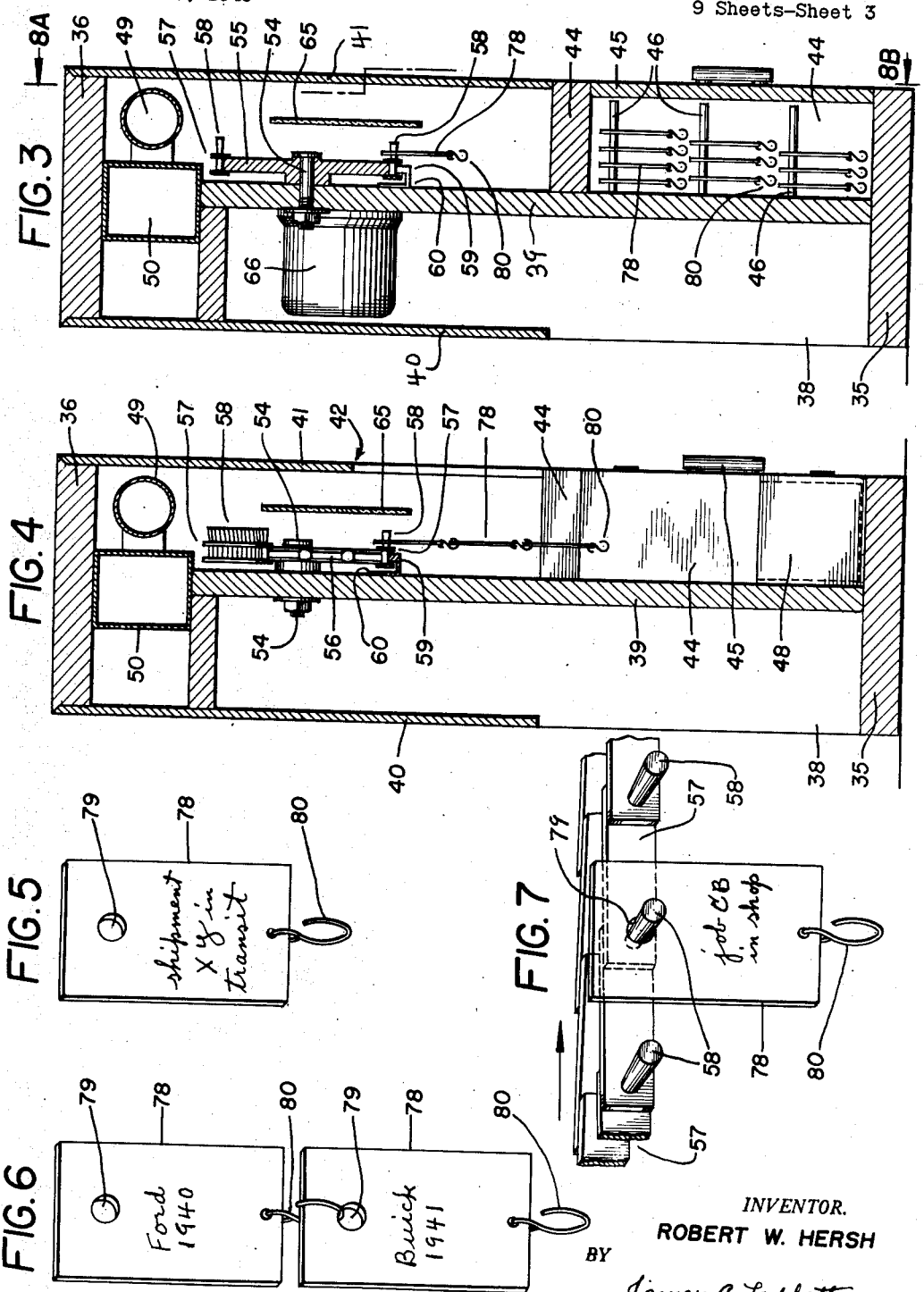
INVENTOR.
ROBERT W. HERSH
BY
James C. Ledbetter
ATTORNEY.

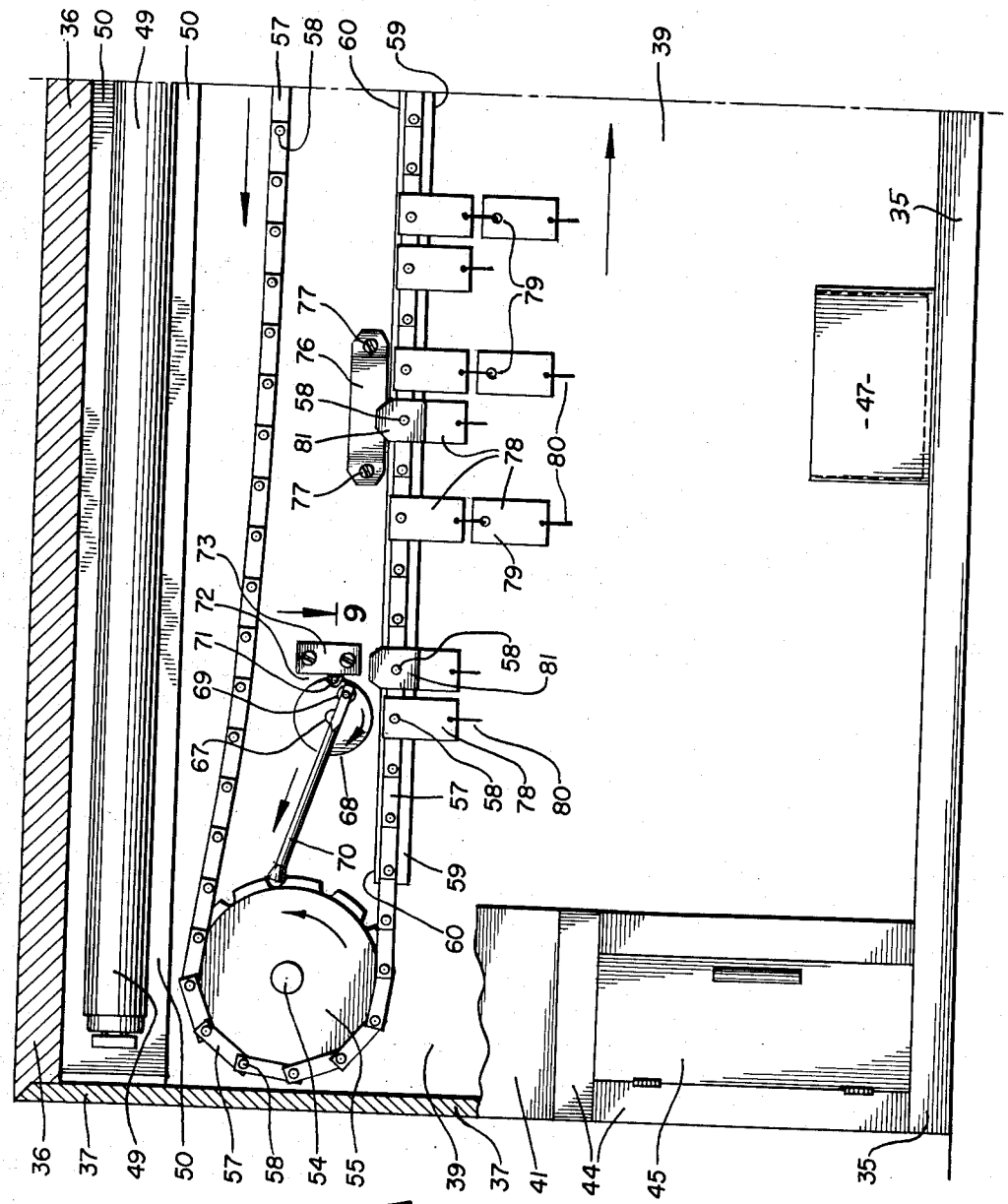

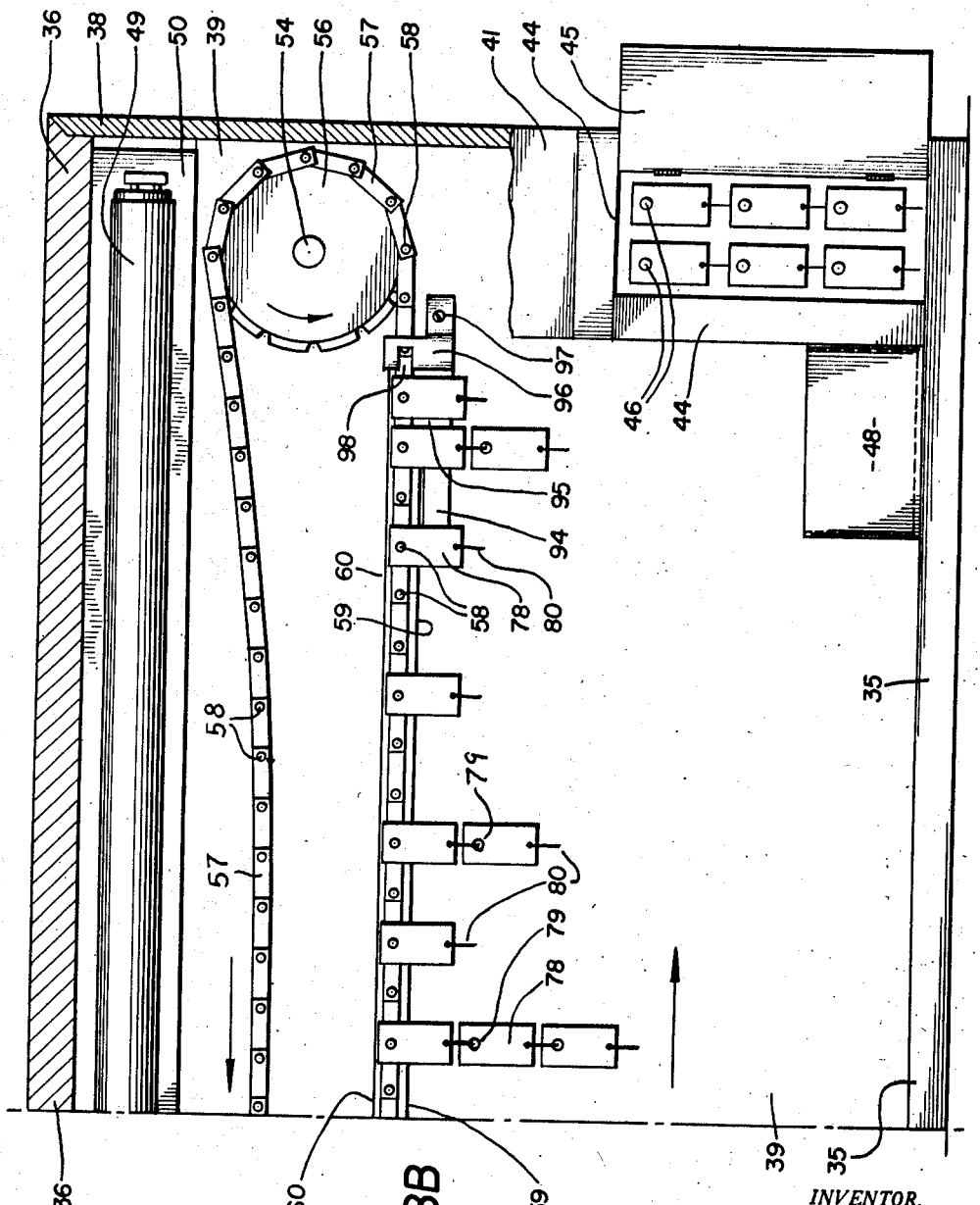

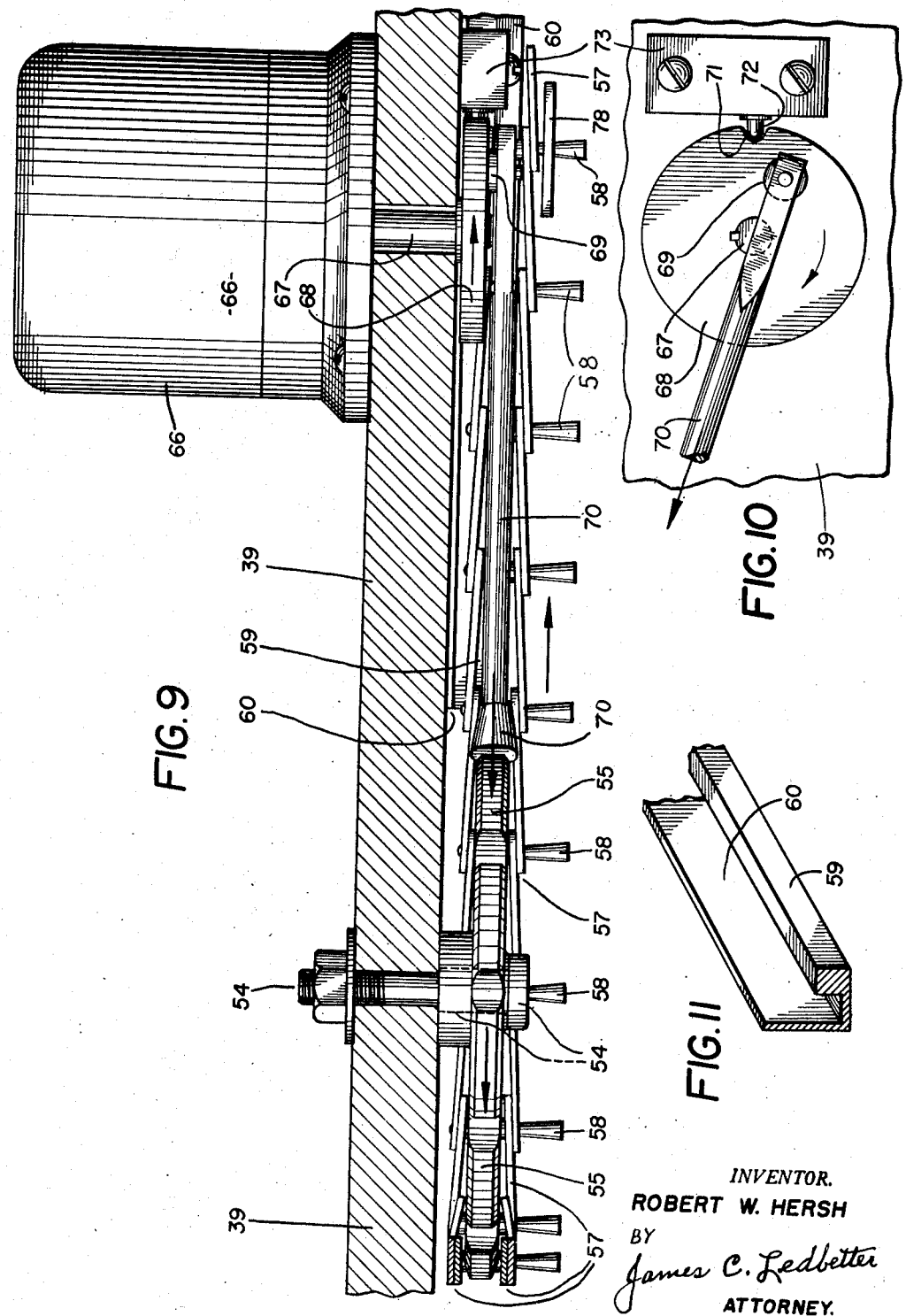

Jan. 9, 1951 R. W. HERSH 2,537,758
INVENTORY CONTROL BUSINESS MACHINE
Filed June 18, 1949 9 Sheets-Sheet 7
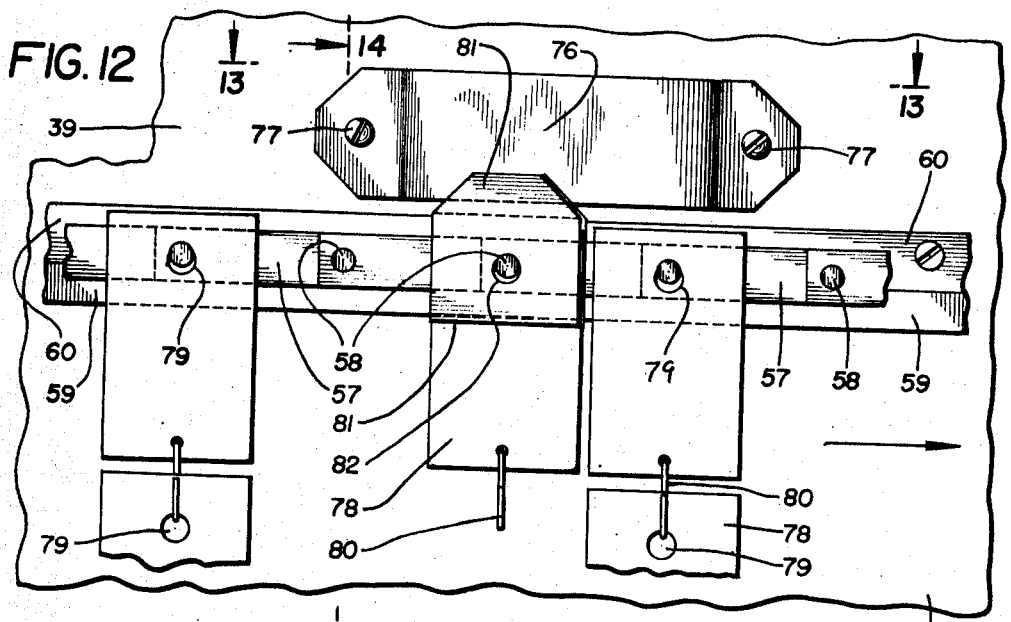
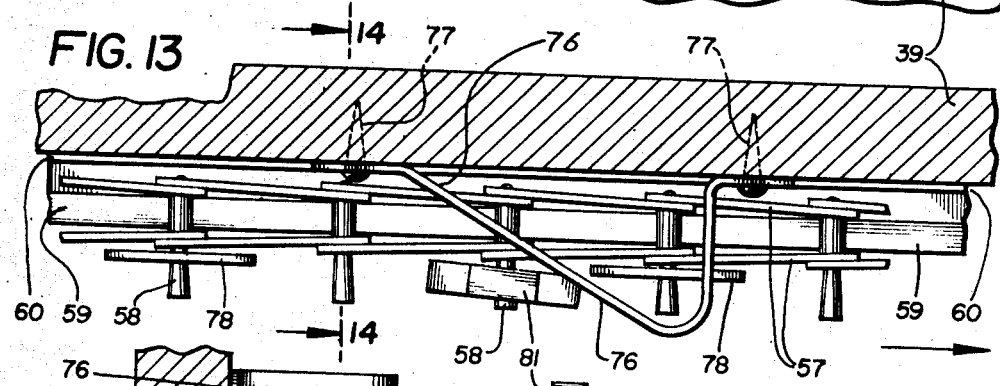
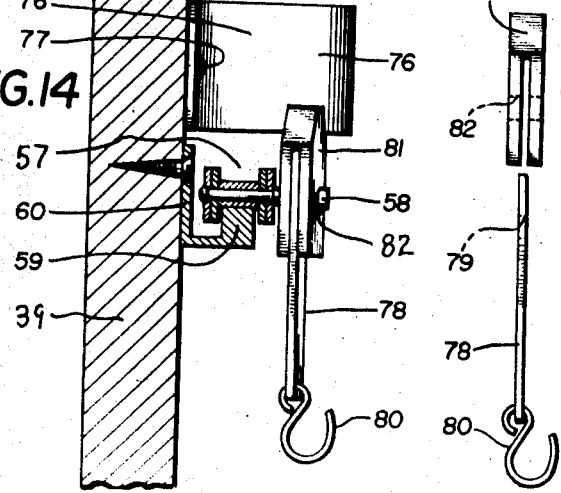
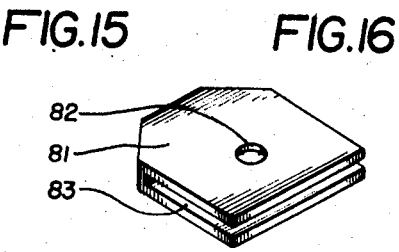
INVENTOR.
ROBERT W. HERSH
BY
James C. Ledbetter
ATTORNEY.

Jan. 9, 1951  R. W. HERSH  2,537,758
INVENTORY CONTROL BUSINESS MACHINE
Filed June 18, 1949  9 Sheets-Sheet 8

INVENTOR.
ROBERT W. HERSH
BY James C. Ledbetter
ATTORNEY.

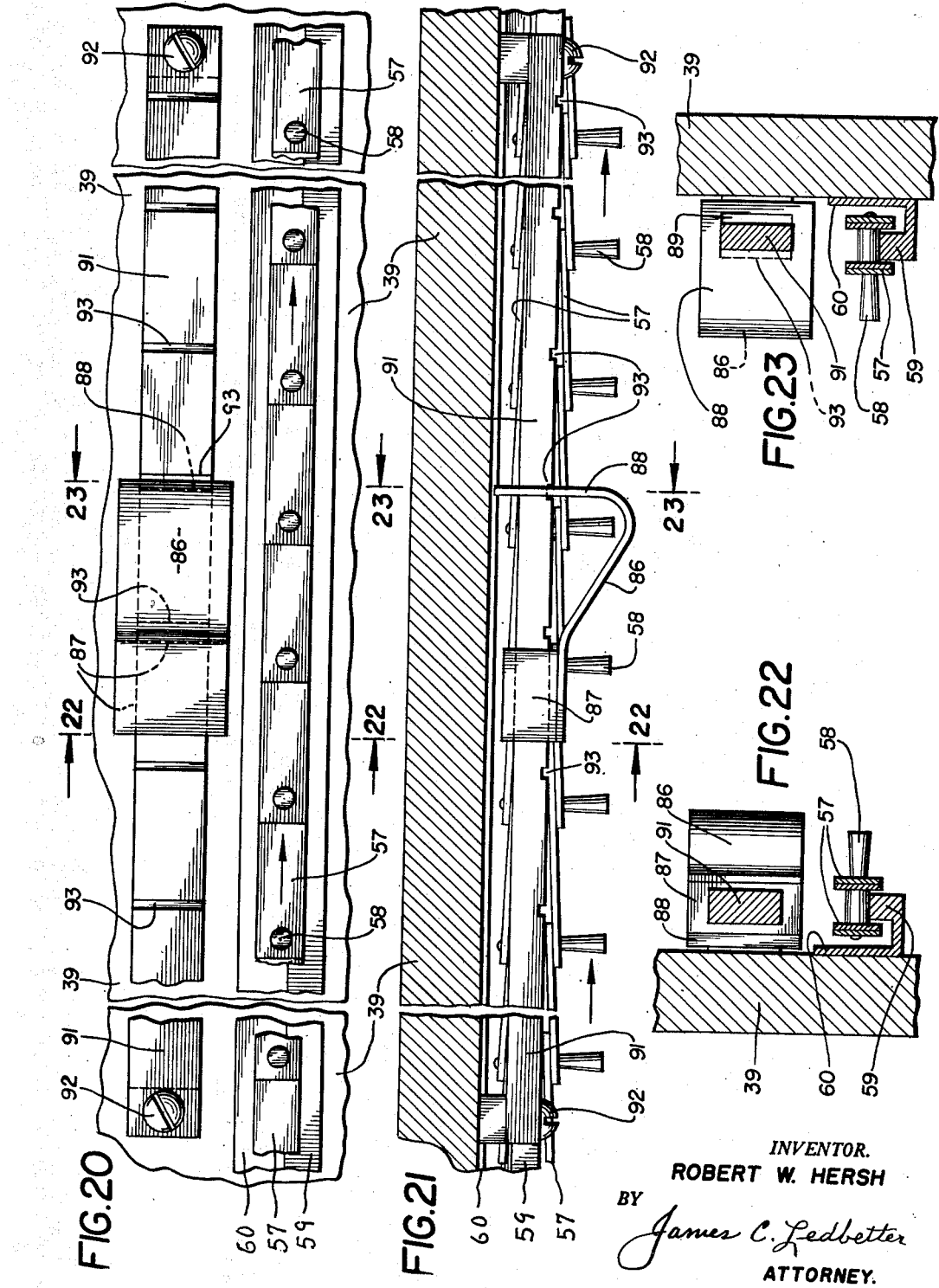

Patented Jan. 9, 1951

2,537,758

UNITED STATES PATENT OFFICE 2,537,758

INVENTORY CONTROL BUSINESS MACHINE

Robert W. Hersh, Elizabeth, N. J., assignor to Hersh Motor Car Company, Inc., Elizabeth, N. J., a corporation of New Jersey Application June 18, 1949, Serial No. 100,012

18 Claims. (Cl. 40—32)

1

This invention relates to a new and useful machine which I ordinarily refer to as an automatic and visual merchandise or inventory controlling apparatus.

However, the invention is herein entitled inventory control business machine. It comprises motor-driven apparatus for keeping time on dates of future events, and is characterized by its setting in a new combination of parts, affording an improved mode of operation, and opening a new field of mechanical control over certain phases of the conduct of business.

The new apparatus is useful as a merchandise or inventory follow-up and finds application as a date reminder in a variety of lines for revealing the status of and keeping tab or tally on future dates and commitments in order to manage more efficiently a business involving manufacturing, repairing, selling, storing goods and other activities.

Among other things, a purpose of the invention is to provide apparatus for carrying out the foregoing operations in a novel manner, which comprises a new combination in a business machine having motor-driven elapsed time indicating elements organized in a new sequence in order to reduce the number of parts of such a machine and to simplify the function of record keeping, by automatically making needed facts and figures stand out in a visible and evident manner.

Thus, it is a purpose to provide a machine which is positive and dependable in maintaining a current follow-up of post-dated business procedure, such as future due dates for the delivery or for the receipt of goods, the re-pricing or the re-conditioning thereof, storage, etc., and to meet other business requirements not satisfied by written records, entries on cards, charts or diagrams which require handling, inspection, study and computations in order to arrive at facts and figures.

My inventory control or business machine in purpose provides a means, in a timing machine, which supplements present day written records, operates to render active and make animate the book records of a business institution, so as to show automatically the time status of goods on hand as regards duration and other factors important to management and to salesmen in their efforts to maintain a turn-over of merchandise. In other words, a business machine, embodying this invention, has its purpose in an office to display openly book records by bringing to the eye needed factual data on a day-to-day basis

2

(or other selected time period) and thus acts as a stimulating telltale on delay in business or overdue events, thereby eliminating dependence upon one's memory to inspect book records.

In one of its preferred forms, the invention is embodied in an elongated housing or cabinet of rectangular form disposed in horizontal position and containing motor-driven and hence active or animated record keeping apparatus. The housing, being somewhat higher than its depth from front to back and somewhat longer than its height, is of convenient size for office installation and may be placed against the wall. Its neat appearance and illuminated display are attractive features.

An endless carrier or conveyor, in the form of a chain or positive drive belt-like means, is mounted horizontally at the front of the housing and travels on spaced sprockets or pulleys, one at each end of the machine, so as to periodically drive the conveyor from one end of the housing to the other for operating a timed date keeping means in the form of inventory or "data" tags placed on the chain. The tags have written thereon pertinent data concerning one's business activities and are ejected automatically after the lapse of a predetermined period, such as hours or days, thus not only catching the attention of the business management but visually displaying needed facts in the interim.

The present machine, as one example of the invention, provides for daily changes of one's general business picture, the data tags being periodically moved (say at noon each day) by a single short motion, from one numbered day on a scale to the next numbered day thereon. Business commitments, goods on hand or in transit, and the variety of post-dated items which confront a business manager, are made to stand out to the eye on a daily changing basis.

The drawings

The accompanying drawings are made from one of my business machines embodying the invention, the overall approximate size of which is about 51 inches long, 23 inches high, and 8 inches deep from front to back of the cabinet. This size machine is well adapted to the timing of business operations on a daily basis, with a numbering series of "1" to "30" or to "31," along a horizontal index or date line at the front of the housing, representing consecutive days, and having certain of its electrical control parts in the rear thereof. The machine herein illustrated is sometimes referred to as a 30 or 31 day inventory control. Thus, it may be adapted to monthly operations.

One important adaptation of this 31-day inventory machine is found in the automobile business, for keeping tally or control on servicing operations, also on cars, trucks, parts, etc., more especially as to the length of time cars have been on hand unsold in order to inform the business management of sale prospects or progress, that is, the history of each car or other goods in a large number thereof received from time to time and which must be sold in order to have a business turn-over. This business machine has been found especially useful in the handling of used cars.

The accompanying drawings with description and claims explain the invention as preferred and embodied at this time for an understanding of the problems sought to be solved. Since the teachings herein may suggest structural changes to others who wish to avail themselves of the benefits of the invention, it is pointed out that subsequent modifications hereof may well be the same in spirit and principle as this disclosure.

Introductory to describing the views in the drawings, it is pointed out that the data tags are shown at their full size in Figs. 5, 6 and 7, also on sheets 6, 7 and 8, of the original Patent Office drawings. Likewise, the fragment of chain is full size in said Fig. 7. Similarly, all views shown on sheets 6, 7, 8 and 9 are drawn full size and hence to scale from the actual machine here illustrated, as one satisfactory example of the invention. The other official sheets of original drawings are made to reduced scale.

Direction-indicating arrows are applied throughout the drawings to show direction of movement of the operating parts. The lower run of the chain advances from left to right, while the sprocket wheels therefor turn counter-clockwise. The direction arrows are the unnumbered ones and are either placed upon or adjacent to the parts to show direction of travel and rotation.

Fig. 1 shows an overall front perspective of the machine, in one of its forms, as viewed from the left end thereof and looking along its daily index line (1, 2, 3 and so on) effective through 31 days. This view shows an inventory tag dropping (left center) after being in the machine 10 days and another tag dropping (right hand end) on the 31st day. The cover for the upper portion of the cabinet is omitted for clarity, as well as certain of the operating parts.

Fig. 2 shows an overall front elevation. The cover for the upper portion of the cabinet is in position. The lower straight run of a date keeping conveyor chain is visible below the horizontal edge of the front cover, while the upper run of the chain and its sprocket wheels are shown in dotted lines behind the cover.

In Fig. 2, the surface shading indicates a "transparent" date-line or index strip, at the lower edge of and behind the front cover, which provides for attractive operational visibility, as later described. On the other hand, Fig. 1 shows an "opaque" index strip. Thus, Figs. 1 and 2 are comparison views illustrating two forms of index strips numbered to indicate consecutive days.

Fig. 3 is a vertical transverse section on the line 3—3 of Fig. 2 and shows the cross sectional form of the cabinet or housing. The left hand sprocket wheel (noted in Fig. 2) is shown in section, as well as the data tag carrying chain at the front of the cabinet, while an electric motor is mounted in the rear thereof.

Fig. 4 is a vertical transverse section on the line 4—4 of Fig. 2, through the center of the machine, and shows the far sprocket (as at the right hand end of the machine Fig. 2), the conveyor chain thereon, and other parts.

Fig. 5 is a perspective view of one of the data tags shown endorsed as to an important shipment of goods and of which the business management desires to be reminded from day to day while it is in transit.

Fig. 6 shows, on the other hand, two data tags adapted to inventory control, a car dealer having written the name of a used car on each tag, and attached one to the other. This view gives an example of how several tags may be hooked together in order to set the same date for two or more post-dated items of different character.

Fig. 7 is a perspective view of the conveyor chain, having tag supporting pintle knobs, with a data tag detachably suspended on a knob. The two or more attached tags (Fig. 6) may be placed on the same pintle knob of the chain. In fact, note that three tags are hanging from one chain knob, as seen at the center (Figs. 1 and 2) of the cabinet, having advanced to the 17th day without any disposition of the items which they represent.

The simple one-piece data and inventory tags shown on sheet 3 are what may be called 31-day tags, since they are designed to remain suspended on the conveyor chain for a full 31-day count, unless earlier removed by hand due to final disposition of the "shipment XY in transit" (Fig. 5), the sale of one or both "Ford 1940" and "Buick 1941" used cars (Fig. 6), and completion of "job CB in shop" (Fig. 7). These data tags are usually made of sheet plastic, in contrasting colors in order to classify them to the different phases of post-dated business items, and are written up by hand. What is known as a "plastic pencil" is used for writing on these tags.

Next, it is observed that each of the sheets 4 and 5 shows a front view of one-half of the length of the machine, being a lengthwise section, vertically along the line 8A—8B of Fig. 3, with the front cover removed from the upper portion of the machine. Likewise, the 1 to 31 day index (as in Figs. 1 and 2) is omitted in order to show the mechanism.

Fig. 8A shows the left hand front and Fig. 8B the right hand front of the machine. By making prints of these two views, cut and joined along the matching dot-and-dash lines thereof, a complete sheet is provided showing a large size front view, drawn to approximately a one-third (⅓) scale of the particular machine herein illustrated. Note also that Fig. 8A shows a horizontal section line 9—9, from which the next view is developed.

Fig. 9 is an approximate horizontal section, along the line 9—9 of Fig. 8A, being a fragmentary top view showing the lower run of the endless chain conveyor (in section) and an electric motor which drives said lower run to the right by a quick-operating push rod, engaging one of the sprocket wheels to intermittently advance or "inch" the chain a given distance, step-by-step, once each day, in order to carry the data tags from one numbered day to the next along the 31-day index.

Fig. 10 is a fragmentary front view of the push rod and its crank which advances the conveyor chain by short and quick increments. This view also shows a latching detent to operate a motor-control switch, as well as to hold the crank and push rod stationary between their timed periods of motion. It is noted that this view is projected downward from Fig. 9, being a partial front view thereof.

Figure 1:
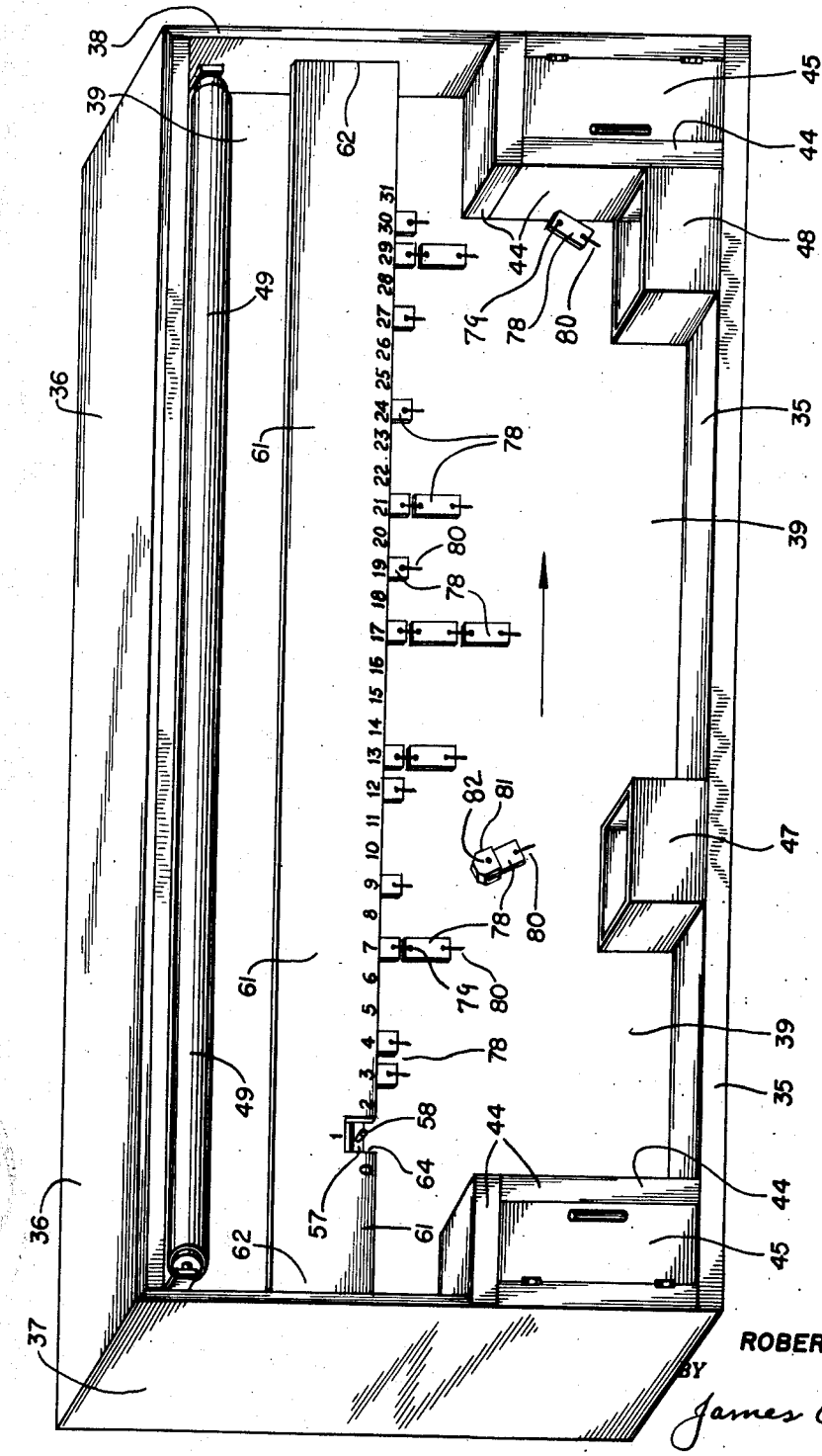
Figure 2:
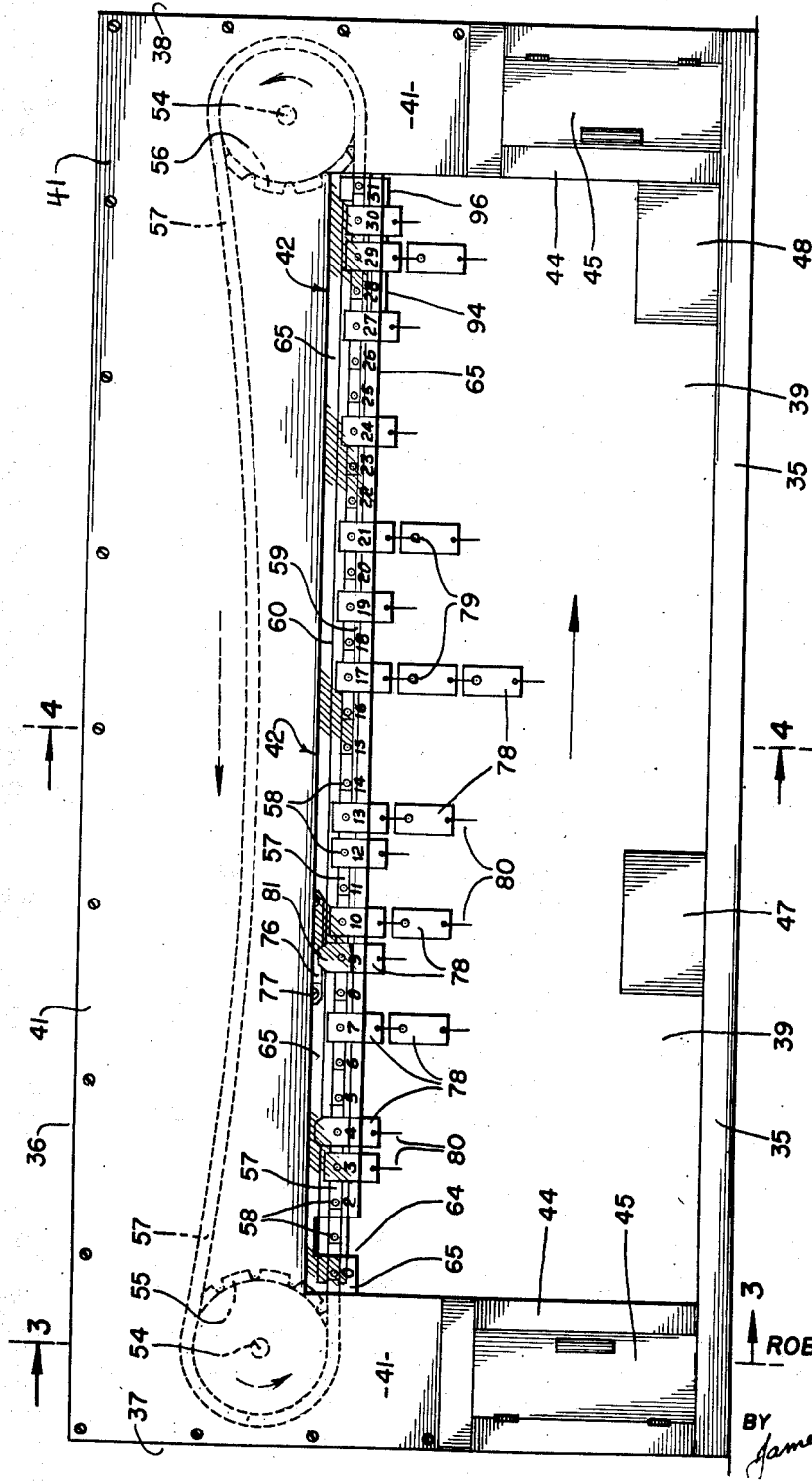

Fig. 11 shows a fragment of track on which the lower run of the endless chain is guided along a straight horizontal line parallel with the indexed date-line extending lengthwise of the cabinet (Figs. 1 and 2).

Sheet 7 shows detail views of a 10-day data tag with its ejecting cam and related parts adapted to short term post-dated business transactions. The 10-day tag (noted in perspective or tilted) in the first three views is poised at rest on the cam at the 9th day and nearing a position to be ejected from the chain on the 10th day. This is a stationary (non-adjustable) cam mounted above the chain and track. Such 10-day tag is a two-part "headed tag" of extended length adapted to reach above the chain and be ejected therefrom by the cam. Its dropping action is shown at the left center (Fig. 1) on the 10th day. The other tags (short length types) are 31-day tags.

Fig. 12 shows a front view of the chain, with one 10-day "headed tag" suspended therefrom, and the 10-day cam for ejecting the tag.

Fig. 13 is a top view looking down on and projected from Fig. 12, being a horizontal section along the line 13—13.

Fig. 14 is an end view looking from the left of Fig. 12 or 13, along the transverse vertical section lines 14—14 of both views. The 10-day "headed tag" is seen in perspective, since it is starting to ride outward on its ejecting cam.

Fig. 15 is an edge view of the 31-day tag (as on sheet 3) adapted to be converted to a 10-day tag (sheet 7) by pressing a head thereon to form a long tag adapted to reach above the chain and be ejected therefrom by the 10-day cam.

Fig. 16 is a perspective of the slotted tag head employed in Fig. 15 to convert a 31-day tag to a 10-day tag.

Sheet 8 is in contrast to sheet 7 and shows detail views of the 31-day tag-ejecting cam and related parts located at the right hand end of the cabinet. This 31-day cam occupies a position at the front of as well as above and below the chain.

Figure 17:
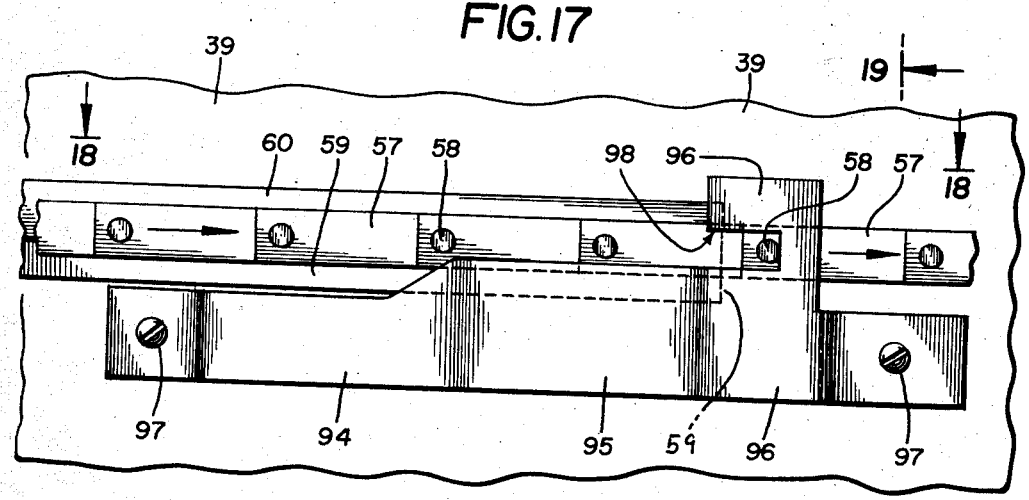

Fig. 17 shows a front view of the 31-day cam mounted in relation to the chain, as stated next above, the tags being omitted for clarity.

Figure 18:
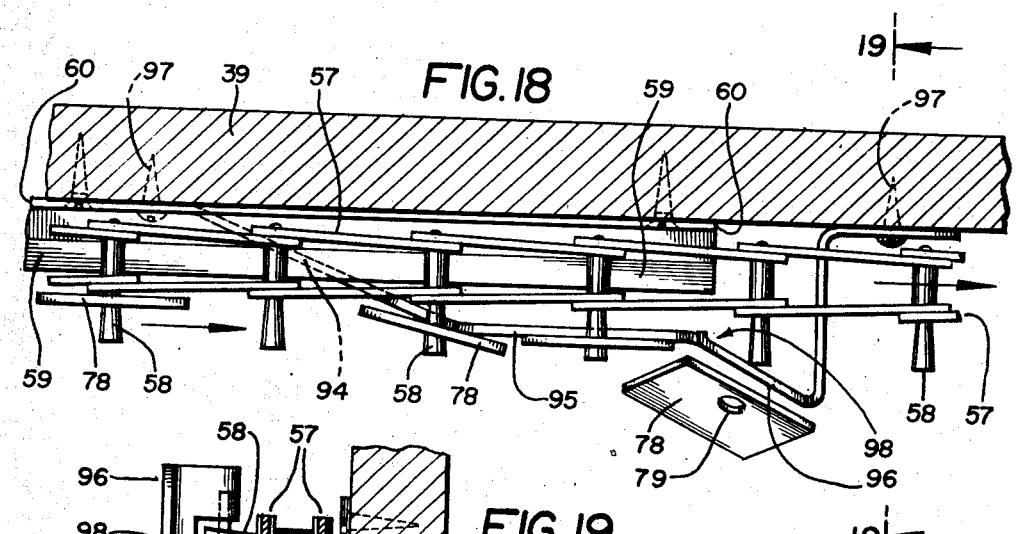

Fig. 18 is a top view looking down on and projected from the previous view, being a horizontal section along the line 18—18. Two tags are shown riding on the 31-day cam, and a third tag (at the right, in top perspective) has been ejected from the chain on the 31st day and is dropping therefrom, as also shown at the right hand end of the cabinet (Fig. 1).

Figure 19:
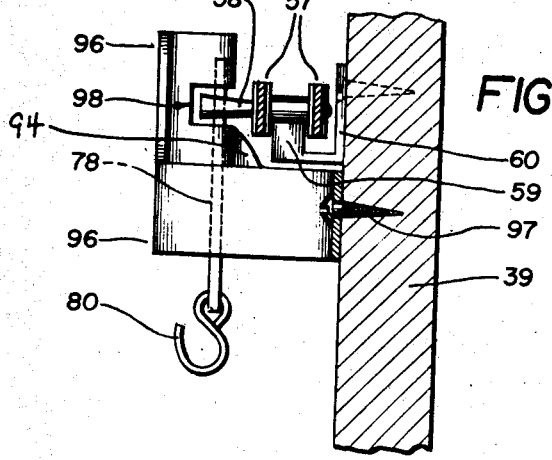

Fig. 19 is an end view looking from the right of Figs. 17 or 18, along the transverse vertical section lines 19—19 of both views, and showing the outer end of the 31-day ejecting cam. The third tag (noted in Fig. 18 as dropping) has passed from sight in this view.

Now it is understood that the 10-day cam device on sheet 7 ejects the two-piece headed tags as assembled in Fig. 15, while the 31-day cam device on sheet 8 ejects the one-piece tags illustrated in Figs. 5, 6 and 7.

Sheet 9 shows a modified form of the invention, comprising an adjustable cam slidably mounted on a horizontal bar and manually adjustable for ejecting data tags at selected days along the 31-day index, say from about the 5th day to the 25th day, and may take the place of the 10-day non-adjustable cam shown on sheet 7. This adjustable cam is for handling short run post dates, which it is desired to time on any basis less than 31 days.

Fig. 20 is a front view of the adjustable cam and may be compared to the non-adjustable cam in front view Fig. 12.

Fig. 21 is a top view of the adjustable cam and may be regarded as developed along the same plane as indicated by the horizontal section line 13—13 in Fig. 12. Accordingly, this top view Fig. 21 can be compared to top view Fig. 21 can be compared to top view Fig. 13 showing the non-adjustable 10-day cam.

Fig. 22 is a transverse section on the line 22—22 showing the inner left end of the adjustable cam and may be compared to the non-adjustable 10-day cam in Fig. 14.

Fig. 23 is a transverse section on the line 23—23 showing the outer or right end of the adjustable cam.

By way of comparison, it may be that the adjustable cam (sheet 9) is preferred over the non-adjustable 10-day cam (sheet 7) because of the fact that the adjustable cam is not fixed in relation to a particular post-dated item and may be manually set and reset from time to time in accordance with one's business policy for handling due dates, etc., of any duration less than 31 days.

At the same time, it is noted that the tag ejecting cams shown on sheets 7 and 9 are more particularly for short term post-dated items, while the 31-day ejecting cam (sheet 8) is for business turn-over or date control on a monthly basis.

Also, at this point it is well to explain that the machine does not necessarily operate for date control as of and from the first day of a month. The 31-day control period starts at any day of the month and usually at number 1 on the index (Figs. 1 and 2).

*The cabinet housing in general*

The housing, in one form of the invention, comprises a cabinet (in this example, made of wood) enclosing the machine parts. There is provided a horizontal base 35 with a top 36 parallel thereto. A left end piece 37 and right end piece 38 are vertically disposed and join the base and top, thus forming a rectangular frame of elongated form.

A center partition 39 is fixed vertically and in mid position of the rectangular enclosing frame. This partition extends from end to end of the four-sided housing frame and from the base 35 to near its top 36, thus dividing the frame into a front open area containing an endless conveyor and other operating means at the front of the machine, while part of the drive and timing mechanism is located on the rear side of the partition 39. Accordingly, the partition supports the operating mechanism midway within the rectangular elongated housing frame.

The four-sided frame may have a back cover 40 on its rear side (note Figs. 3 and 4) which closes, if desired, the upper rear area and extends part way down, as shown. A front cover 41 is mounted at the upper portion on the front of the frame, thus enclosing the upper run of the conveyor chain and other parts of the machine. The front cover has its lower edge 42 extending horizontally from adjacent one upright end 37 to the other upright end 38 of the cabinet. The position of the lower edge 42 of the cover 41 is important concerning operational visibility.

Thus the rear cover 40 and front cover 41 applied to the four-sided frame provide an overall enclosing housing for the operating mechanism installed on the mid-partition 39.

A storage compartment 44, for enclosing a supply of inventory tags, may be located at the bottom left and right corners at the front of the housing. The two storage compartments 44 are closed by doors 45. Horizontal pins 46 (note Figs. 3 and 8B) have their rear ends anchored in the mid-partition 39 and hold a supply of inventory tags.

An open top box 47 is placed on the base 35 at the front of the machine (left center Figs. 1 and 2) to catch short run tags, say of 10 days' duration or other period less than the full 31-day operation. Also an open box 48 is placed at the right end of the machine to catch long run 31-day tags. The tag boxes or receptacles 47 and 48 are usually made of transparent plastic for greater visibility of the data tags which drop into them for attention of a business management.

An electric light in the form of a luminous tube 49 is mounted in the upper front portion of the housing. Each end of the long lighting tube 49 is supported in releasable electrical contact brackets mounted on an elongated enclosing base 50 which holds the operating parts for a conventional lighting tube of this type. Thus, it is seen (Figs. 3 and 4) that the lighting assembly is disposed within the housing adjacent its top 36 and the upper edge of the mid-partition 39.

The light from the tube 49 extends downward under the front cover 41 and spreads at the lower horizontal straight edge 42 thereof, thus fully illuminating the front of the machine and making an attractive and visible display. The uniform illumination affords good indirect lighting for the 31-day index line (Figs. 1, 2, etc.) so that the facts and figures (business data) endorsed on the tags are prominently displayed.

*Operating mechanism*

The tag carrying or operating mechanism is of simple form and comprises a driven endless chain with special pintles connecting its links and also supporting the several types of data tags of which two are shown in this example of the invention. The chain is "inched" or advanced in short quick increments, once a day, for moving the tags (representing the merchandise on hand or other dated item) along the 31-day index line (Figs. 1 and 2). Conventional mechanism, such as electric wiring, with switches, an electric clock and other devices, is omitted from the drawings for clarity.

A pair of axles 54 have their rear ends fixed in the mid-partition 39 and extend horizontally forward. A left sprocket wheel 55 and a right sprocket wheel 56 turn freely on the two spaced axles. It is noted that the two axles are located above and behind the lower horizontal long viewing edge 42 of the front cover 41 so as to position the lower side of each sprocket wheel therebelow. The left sprocket is the driven one in the present example of the invention, while the right sprocket idles, both turning freely on the stationary axles 54.

An endless link chain 57 (conventional type) is carried on the two spaced sprockets 55 and 56. The links 57 (in pairs) of the chain are pivotally connected, end to end, by pintles which project outward horizontally free the side of the chain and thus provide tag supporting means in the form of tapered knobs 58. These conveyor tag knobs 58 are axial extensions of the chain link pintles and are enlarged on their outer ends. They taper inwardly to the side of the chain where they reduce to bearing size and thus form pivots on which the links 57 are operatively assembled. In other words, each knob 58 is frustoconical, thus having a large outer end and a small inner pivot shaft. The link pintles of the knobs 58 may have conventional spacing rollers (see Figs. 14 and 19) thereon to ride a track, later explained. This is one form of tag supporting chain linking means which operates successfully on the present machine.

A straight run track 59 (Fig. 11) has an upright running flange 60 parallel therewith. The flange is secured horizontally to the front side of the mid-partition 39 immediately under the lower or advance run of the endless chain 57. Thus the track 59 supports the lower run of the chain against sagging and maintains it in a straight horizontal line parallel with and under the horizontal viewing edge 42 of the front cover 41. The track extends approximately from one sprocket 55 to the other 56. The upper or return run of the chain 57 need not be supported and may sag a little as noted (Fig. 2); it is concealed from view behind the front cover 41 of the housing. The chain pintles (the rollers thereof) ride smoothly on the track (note Fig. 14, etc.).

In Fig. 1, there is shown an "opaque" index strip 61 having its two extremities fixed at 62 in the two ends 37 and 38 of the housing. This index member is a long narrow strip (mounted horizontally behind the front cover 42) with its lower edge parallel to and just below the lower straight run of the chain 57. The lower sighting edge of the index strip 61 has printed or painted thereon a series of numbers representing consecutive days, to-wit, 1 to 30 or 31. This may indicate a monthly period of time, if desired. An entry notch 64 is provided at the left lower edge of the index strip and opens to the lower run of the chain at No. 1 day in the machine or the 1st day of the month in the event one's business is thus adapted.

The pintle knobs 58 horizontally traverse (from left to right) the notch 64 when the chain 57 advances. This notched opening 64, through the lower edge of the index strip 61, provides for convenient access to the chain knobs 58, when manually placing inventory tags on the chain, as later explained. The luminous tube 49 spreads its light rays downwardly across the front of the index strip 61 and illuminates the series of numbers from 1 to 31, thus making them plainly visible.

In Fig. 2, similarly, there is shown a "transparent" index strip 65 mounted in the housing, in any suitable manner and in the same relation to other parts as above described in reference to the "opaque" index strip 61. A sheet of clear plastic makes a good transparent indexed strip 65. Thus the lower edge of this transparent member is also parallel to and just below the bottom of the track guided lower run of the chain 57 and is provided with a series of numbers representing consecutive days, to-wit, 1 to 31. The same tag entry notch 64 (as in Fig. 1) is provided at the left lower lower edge and opens to the lower run of the chain, which provides for convenient access to the knobs 58 when manually placing inventory tags thereon, as later explained. The luminous tube 49 spreads its light rays downwardly across the front and rear of the transparent index strip 65 and fully illuminates the series of numbers from 1 to 31.

The foregoing description contrasts the indexed "opaque" strip 61 (Fig. 1) and the "transparent" indexed strip 65 (Fig. 2) in a way to make clear the like purpose of both. It is thought that the transparent strip 65 may be preferred since it affords greater operational visibility, illumination and attractiveness, than the opaque strip 61. By reference to Figs. 3 and 4, the relation of the "transparent" index strip 65 to other parts is noted, and the same is true of the "opaque" member 61. In making the official patent drawing herein, it was found that the running day numbers 1 to 31 more clearly show on the indexed "opaque" strip 61, as a matter of illustrating the principles of the invention.

An electric motor 66 (sheet 6) is mounted on the back side of the mid-partition 39. The motor has a drive shaft 67 extending horizontally through the partition, and a crank disk 68 is fixed on the front end of the drive shaft 67 and thus rotates at the front side of the partition. A crank pin and bearing 69 is carried by the crank disk 68, and a push rod 70 has its bearing (right end) pivotally connected with the crank pin in a known way.

The left end of the push rod 70 operatively engages the left sprocket 55 (against a tooth thereof) and is adapted to rotate the latter counterclockwise in a step-by-step motion. In other words, the free end of the push rod ratchets within the teeth of the sprocket wheel 58 to actuate the latter by short movements equal to the spacing of the teeth. And each movement of the sprocket 55 (hence the chain 57) is equal to the mean distance between the day numbers 1, 2, 3, etc., indexed on the sighting edge of the elongated strips 61 and 65 (Figs. 1 and 2).

The crank disk 68 (sheet 6) is provided with a detent notch 71 in which a spring actuated plunger 72 releasably engages the detent notch. A switch 73 is mounted adjacent the crank disk 68 and mounts the spring actuated plunger 72. The switch parts 72 and 73 are conventional and shown diagrammatically. The motor 66 drives the crank disk 8 clockwise and acts to cam the plunger 72 back into the switch for controlling the latter in a known way. When one complete revolution of the crank disk 68 occurs (thus making one complete stroke of the push rod 70), it follows that the spring actuated plunger 72 again drops into the detent notch 71.

The latter action serves to hold the crank disk 68 and pivoted push rod 70 in a predetermined stationary position, at the end of each stroke of the push rod, and hence after each advance of the chain 57 along its track 59 and along the sighting edge of either index strip 61 or 65. As previously stated, each linear advance of the chain, the lower run thereof, from left to right, is equal to the spaced distance between the running day numbers 1, 2, 3, etc. to 31.

Since the motor 66 is conventionally timed to actuate the push rod 70 once a day (say at noon every 24 hours), it is seen that the lower run of the chain 57 advances one index number each day and requires 31 days to traverse the index strip. In the machine at hand, from which the drawings herein are made, the index numbers 1, 2, 3, etc. to 31 are spaced one inch.

Thus the push rod 70 (see Fig. 8A) thrusts to the left, under the single-turn impulse of the crank 68, clicks the left sprocket 55 counterclockwise the distance of one tooth, drops by gravity back to its position shown into the next sprocket tooth, thereby advancing the chain 57 one inch, and moving all tag knobs 58 to the next index number on the 1, 2, 3 scale. This cycle is repeated once a day, the chain advancing a distance equal to the length of its links.

The periodic or once-a-day advance of the chain 57, with its data tags as next described, makes clear that the machine is not in continuous operation. Thus, the machine is free from wear and tear, uses little electric current, and is quiet in operation.

*The 10-day cam—The data tags in general*

As heretofore stated, this part of the operating mechanism is shown in large detail on sheet 7. The 10-day cam is also seen in Figs. 2 and 8A.

The 10-day cam comprises a stationary angle bracket 76, each end of which is fastened with a screw 77 to the front face of the upright mid-partition 39. The inner (low) end of the cam is at the left and its outer (high) end at the right. Its inclined (angular) form is better understood by comparing Figs. 12 and 13. Such cam has its lower edge parallel with the track and chain 57, and its angular surface deflects outwardly beyond the track, thus intersecting the track and acting to eject or knock off a data tag riding against it when advanced therealong by the chain, as at the left center (Fig. 1) where a 10-day tag is dropping into the box 47.

Coming to a description of the data tags, the two types shown will be explained at this point. One type of tag is operative with the 10-day cam (sheet 7), and also with the adjustable cam (sheet 9). The other type of tag is for use with the 31-day ejecting cam (sheet 8). Both types may comprise rectangular flat card-like pieces 78, plastic being suitable therefor.

One end of such tag is provided with a hole 79 slightly larger than the outer end of the chain knobs 58 in order to be placed thereover. The other end of the tag 78 is provided with a hook 80 in order to attach several tags together (Fig. 6 and other views). Note the three tags in a unit at the 17th day (Figs. 1 and 2).

Various colors of data tags 78 may be used in order to have a selection of contrasting colors to represent different types of merchandise or phases of business transactions. Thus, a supply of tags may be stored for convenience in one or more of the housing compartments 45 on the horizontal pins 46 behind the doors 45. As postdated matters arise, the tags are removed from the compartments 44, marked with job numbers, names, etc., or merchandise identification, and placed on a knob 58 of the chain, usually at No. 1 day of the index strip 61 or 65 (Figs. 1 and 2). Examples of marked tags, showing various transactions in progress, are shown on sheet 3.

The one-piece data tag 78 is for use on the 31-day schedule and thus is ejected only by the 31-day cam (sheet 8), as later described. However, by simple adjustment, it is converted for short run post-dated items under the control of the 10-day cam. In order to make the one-piece tag operative on a 10-day basis (with the ejecting cam 76), it is necessary to employ a tag head 81 (sheet 7). This tag head 81 is provided with a center hole 82 and with an attaching slot 83. The head 81 is placed upon the upper end of the tag 78, whereupon the hole 79 of the latter registers with the hole 82 of the head, one with the other. This use of the head to lengthen a data tag is noted in the drawings (Figs. 15 and 16), the two parts preferably having a frictional or press fit to hold them together.

Having thus assembled a 10-day tag 78 with its head 81, the two-part tag is placed on the chain knob 58, usually through the entry notch 64 at the left end of the "opaque" index strip 61 or the "transparent" index strip 65, whichever is preferred for use when producing this machine. The line of knobs 58 is just to the rear and above the indexed scale 1, 2, 3, etc., by virtue of which it is seen that tags 78 (with or without heads 81) may be placed on the chain at any selected day number.

In operation, as the chain 57 advances by increments along the index strip 1, 2, 3 and so on, one movement each day (usually at 12 noon), the data tag 78 having its head 81 eventually reaches the angular face of the cam 76 and climbs outwardly thereon until it drops off. When the chain 57 makes its 10th movement, the cam 76 ejects the tag from the chain. The tag then drops into the 10-day receptacle 47 (Fig. 1), being thus accomplished by the rise or outer deflection of the stationary cam 76 which is "fixed" for 10-day dated items written upon the face of one or more tags 78.

It is seen that the inward taper of the chain knobs 58 insures the retention of the data tags 78 on the periodically actuated chain. The weight of the tag urges it inward down the tapered knob toward the chain, thereby keeping it in place. Each tag requires the definite outward push of the cam 76 to eject it from the chain, this being true also of the other cams hereinafter described.

The adjustable cam

As stated before, this cam (sheet 9) offers greater flexibility in short term or quick turn-over post-dated business transactions, such as setting dates for inventory disposal or check-up, making dates for receipt or shipment of goods, the return of rented cars, and business appointments and the like, in various lines of trade. Being more flexible in its adaptation, than is the non-adjustable 10-day cam heretofore described, there is likelihood of preference for this adjustable cam when producing these machines for general use.

As previously stated, this improved cam is shown full scale (sheet 9), that is, the same size as and for the machine from which the original patent drawings herein were made. The location of the adjustable cam in the machine will be understood by observing certain views (Figs. 2 and 8A, and also sheet 7) showing the 10-day cam 76 in relation to other parts. Thus, it is seen that this new cam may be mounted in the same relation as the 10-day cam 76 (when substituted for the latter) but is adjustable along the 1, 2, 3, etc., index scale. The adjustable cam works with and ejects the 10-day two-piece data tags 78 fitted with heads 81. However, all tags are omitted for clarity (sheet 9) in the interest of describing this manually re-settable cam.

Accordingly, a manually adjustable cam 86 has one end secured to a mounting sleeve 87 and is movable along the index scale. The other end 88 forms a spring detent latch for the cam. Such end 88 is made with a latching aperture 89 (see Fig. 23) of rectangular shape. The cam portion 86 is disposed at an angle to the axis of the sleeve 87. In other words, the angular form of this new cam 86 is patterned after that of the previously described stationary 10-day cam 76 and serves like purpose but has the additional function of being readily adjustable to any day position along the index scale, as from 5 to 25 thereon. This adjustable cam is preferably made of resilient material in order to spring-load its angular portion 86, and by which it may be flexed manually outward, in relation to its holding sleeve 87, and then spring back into original position when released by an operator after he has adjusted it to a chosen position on the index scale.

A long bar member 91 (having cam retaining, guiding and adjusting functions) is rectangular in cross section and has its ends fastened, as by screws 92, on the front face of the upright mid-partition 39 in a position parallel to and above the lower or advance run of the chain 57. The front face of the bar is provided with a series of latching detent notches 93 uniformly spaced, in this example, one inch to equal the uniform spacing of the tag knobs 58 and hence equal to the spacing of the day numbers on the 1, 2, 3, etc., index scale. The detent notches 93 provide for registration of the adjustable cam 86 with the day numbers of the graduated time indicating scale on the index strips 61 or 65, and may extend from about the 5th day to about the 25th day thereof, or from 1 to 31 if desired.

The movable mounting sleeve 87, carrying the inner left end of the spring-loaded adjustable cam 86, is slidably carried on the stationary guiding bar 91, and the spring latch outer right end 88 resiliently rests within one of the chosen notches 93 along the graduated day scale 1, 2, 3, etc., somewhere between 5 and 25 thereon. This arrangement latches the cam 86 in selected fixed position on the bar 91, in one of its detent notches 93, for a similar purpose to that heretofore described for the 10-day cam 76. The exception is that this tag-ejecting cam 86 may be set at any day number along the index scale.

Slidable adjustment of the cam 86 along its guiding bar 91 is simple. Having selected a day number on the scale, the spring latch 88 is pulled forward by hand, thus releasing its latching aperture 89 (Fig. 23) from the bar detent notch 93, whereupon the sleeve 87 and its cam 86 are slid along the bar until the selected day setting is made and the spring latch again grips the selected detent notch to hold the cam stationary. The cam 86 is thus set to a day number on the index scale 1, 2, 3, etc., chosen by the operator.

In the two foregoing topics, a description has been given of the 10-day cam 76 (sheet 7) and the adjustable cam 86 (sheet 9). Both provide for short period post-dated business control (intermediate of No. 1 day and No. 31 day on this index scale) for stimulating or "tickling" to activity matters in progress. However, one of the more important business uses resides in a longer period control, say for at least a month.

The 31-day cam and utility of the one-piece data tags

This third and last cam is shown in Figs. 2 and 8B, more particularly in full scale detail on sheet 8. Its purpose is to eject the data tags after the full run of the index scale 1, 2, 3, etc., say on the 31st day and drop them into the 31-day box 48 for further attention of the operator. The one-piece tag 78 (without the head 81) is used with this 31-day cam, the latter being indicated generally at 94.

Accordingly, the 31-day cam has a first angular portion 94 inclined outward and toward the right, intersecting the track 59, as well as the path of the linear travel of the tag supporting knobs 58. This first angle 94 then straightens to form a flat portion 95 set parallel with the chain 57, and said flat portion is spaced from the chain a part of the axial length of the knobs. Then the flat portion 95 angles outwardly, beyond the ends of the knobs, to form an ejecting cam 96. Screws 97 fasten each end of the 31-day cam to the front face of the mid-partition 39. This second and last camming portion 96 is somewhat wider (higher) than the first angle 94 and flat portion 95.

It will be seen that the overall reach of this stationary multi-stage cam is disposed alongside and in front of the chain 57, also below and above it, and that the two screws 97 mount it in such position. Note also that the last cam angle 96 is somewhat wider than portions 94 and 95 and extends above the chain. Furthermore, the wide cam portion 96 is made with a notch, in the form of a knob passage 98, which is in alignment with the chain. This passage 98 permits the lower run of knobs 58 to pass through the wide end cam portion 96 as the latter ejects the data tags on the 31st day of the 1, 2, 3, etc., index scale behind the long viewing edge 42 of the front cover 41.

Data tags 78 without the heads 81, suspended on the knobs 58, first reach the cam angle 94 and thus partly are thrust outward on the tapered knobs. The tags then "inch" along the flat portion 95 of the cam (closely riding it) and approach the last-stage wide ejecting cam end 96. Next, the last advance of the chain 57 acts to pass a knob through the passage 98, thereupon causing the cam 96 to pull the tag 78 from its poised position on the knob and drop it into the 31-day box 48 (see Fig. 1). This action also is demonstrated in Fig. 18, where the tag 78 has been ejected from the knob 58, as the latter passed through the knob passage 98, and said tag is dropping from the chain.

It is pointed out that the final ejecting cam portion 96 at the right end being somewhat wider than its left end, extends above and below the line of travel of the knobs 58. This arrangement renders certain that the top portion of the tag 78 will be thrust outward by the upper portion of the cam 96 with assurance that the tag will not hang on the knob and cause a jamming when the latter goes through the cam passage 98.

By providing a first stage camming angle 94, followed by a flat run 95, and a final stage ejecting cam portion 96—the one-piece tag 78 (less its head 81) will undergo an outward ejecting thrust so as to prevent the tag from side tilting and binding on its knob. In other words, the full vertical length of the last cam portion 96 serves to smoothly eject the one-piece tag 78 by the same mode of operation as the two-piece tag (78 and 81) is ejected by the 10-day cam 76 and by adjustable cam 86, as heretofore described, both of which are located above the chain 57.

*General summary of features, operation and utility*

Further advantages are to be noted concerning certain features and principles of the invention, utility of the business machine, and examples of every day practice.

It will be seen that the two index strips 61 and 65 are examples of ways and means of providing a graduated time indicating scale along the lower or advance run of the endless chain 57—other means thereof formed with the housing being within the spirit of this invention. Likewise, the forms of the data tag 78 and the head modification 81 (in size, length and shape), with the attaching hook 80, comprise good working examples—the utility of which offer and suggest other types comprehended herein.

Among other things, the time indicating day scale 1, 2, 3, 4 and so on (or graduated to other measured periods) may begin with a zero "0" marking (Figs. 1 and 2). It is a simple matter to insert either a short (small) size data tag 78 or a long (large) size tag 78, 81 to the left through the entry notch 64 and hook it upon the particular chain pintle knob 58 which is at rest opposite to and in registration with the "0" mark. Accordingly, upon the next daily or other periodic movement to the right of the advance run of the chain 57 (being the lower run thereof), it follows that the tag, which started in at "0" day, now comes to rest at day number "1" on the scale, and that such tag has been in the machine for one day. Other and further timing and scheduling variations are possible to practice with the machine, depending upon the nature of one's business.

Suppose, for example, that a second hand automobile dealer receives a 1940 Ford used car and also a 1941 Buick used car on which he desires to allow 10 days for reconditioning before placing them on sale. He may write up one or more tags 78 and attach them as a unit (Fig. 6) and thereupon affix a 10-day tag head 81, as heretofore explained (sheet 7). He then places this unit of two tags on the pintle knob 58 at "0" day or "1" day on the index scale. Thus he has scheduled the two second hand cars for 10-day intermediate repair jobs, the existence of which and every shortening period allowed therefor, are actively and plainly visible from day to day until the work is done. In the event the cars are not reconditioned within 10 days, then the two-tag unit drops into the 10-day box 47, thus automatically attracting the dealer's attention, and he may take action by inquiring of the delay.

It is understood, of course, that the 10-day period is used here as an example. Such period works well in my line of business and according to my policy, hence the 10-day tag-ejecting cam means (sheet 7). However, it is well to embody the adjustable-time tag-ejecting cam (sheet 9) in the machine in order that a business manager may set his working period for a longer or shorter intermediate operation. Incidentally, the intermediate box 47, for catching the tags, is also movable on the base 35 to place it under any day position to which the adjustable cam 86 may be set.

In considering the foregoing, it will be understood that the adjustable tag-ejecting cam 86 (sheet 9) may be reset from time to time for shortening or increasing the telltale period on post-dated transactions. With a two-piece headed tag 78 and 81, the business manager can always provide for a short post-dated reminder, the operation of which does not interfere with the longer 31-day period. The two types of tags (one-piece short or small size and two-piece long or large size) operate simultaneously without interference with each other in relation to their respective tag-ejecting means. Three examples of the latter are shown (sheets 7, 8 and 9) to predetermine elapsed periods of time on the graduated scale, along which the lower advance run of the chain 57 is periodically actuated, in uniform increments of "inching" distance traveled, equal to the uniform spacing between the scale graduations. The 31-day cam (sheet 9) is employed at the far end or limit of the scale in combination with either or both of the intermediate cams (sheets 7 and 8).

When reconditioning of the foregoing car or cars (tags, Fig. 6) has been completed, within the allowed 10-day period, the large size tag or tags 78, 81 are removed from the advance (lower) run of the chain 51 and thus before reaching the 10-day ejecting cam 76. Thereupon, one or more 31-day short tags 78 of one color are marked to identify the cars and placed in the machine on a 31-day "for-sale" run. At the end of that period, if not sold, tags of another color for contrast are marked for the same cars and scheduled for a second 31-day run.

Consequently, one can tell at a glance, by the data tag color (and also size), how long merchandise has been on hand—whether 10 days, 30 or 60 days and so on. Thus when looking at the machine loaded with dozens of contrasting data tags representing merchandise in many different categories, hence actually seeing one's total stock of goods at a glance, it is a simple matter to classify, sort and recast sales policy or other post-dated business matters—more so than having to work it out through book and card records.

To like advantage and convenience, as in the foregoing, a business manager may have a shipment of goods in prospect (Fig. 5) and/or may have a particular job in progress in his or another repair shop (Fig. 7). Quickly writing a note on a tag identifying any transaction, and post-date scheduling it in the machine, provides the business manager with a visible day-to-day reminder of the time status concerning these and other transactions. Each separate item shows up daily; one can actually see his time problems, the status thereof, and how long overdue for this and that subject.

This disclosure explains the principles of the invention and the best mode contemplated in applying such principles, so as to distinguish the invention from others; and there is particularly pointed out and distinctly claimed the part, improvement or combination, which constitutes the invention or discovery.

The invention is presented to fill a need for a new and useful business machine. Various modifications in construction, mode of operation, use and method, may and often do occur to others, especially so after acquaintance with an invention. Accordingly, it is to be understood that this disclosure is exemplary of the principles herein and embraces equivalent constructions.

What is claimed is:

1. A business machine comprising an endless link chain operating on sprocket wheels spaced apart to provide an advance run and a return of said chain; a knob formed on an end of each and every pintle pivotally connecting the ends of the links constituting the chain, and all of the knobs extending from the same side of the chain; a scale graduated to indicate elapsed time and being mounted parallel to the advance run of the endless chain, the scale graduations being uniformly spaced apart a distance equal to the spacing of the knobs and hence equal in length to that of the links of the chain; operating means connected with the chain to actuate it in periodic increments, along the advance run of the chain, a distance equal to the length of that of the links of the chain, and hence to advance simultaneously all the knobs to a position in uniform registration with the spaced graduations on the scale; in combination with data tags manually placed ejectably upon the knobs and adapted to be endorsed with follow-up business transactions; and data tag-ejecting means, mounted in alignment with the path of advance of the knobs, at a selected position on the scale, to eject said tags at a predetermined time thereon.

2. The business machine described in claim 1 and having further features characterizing it—in that more than one data tag-ejecting means is provided at different elapsed time periods selected on the scale; and also in that more than one size of data tag is provided as a part of the combination, and thus some tags are small and some are large, the small data tags being ejected by one ejecting means and the large tags by another ejecting means; whereby small tags are endorsed as to follow-up business transactions scheduled for one time period, and large tags are endorsed for another.

3. The business machine described in claim 1 and having further features characterizing it—in that the data tag-ejecting means comprises two devices, one of which is above the advance run of the chain, while the other is below it; and also in that two types of data tags are included in the combination, said tags being of different length, the long tags being ejected from the chain by one of the devices, while the short tags are ejected by the other device; whereby the machine operates in respect to two predetermined times.

4. The business machine described in claim 1 and having further features characterizing it—in that a guiding member is mounted parallel with the path of advance of the knobs and of the scale; and the data tag-ejecting means is carried upon the guiding member, being adjustably movable therealong, and thus providing for a selection of a position along the scale as to the predetermined time to set the machine for ejecting its tags.

5. The business machine described in claim 1 and having further features characterizing it—in that an elongated guiding bar is mounted in fixed relation to and alongside of and parallel with the advance run of the knobs and parallel with the graduated scale, also the data tag-ejecting means comprises a cam bracket slidably adjustable along the guiding bar in relation to the scale, an angular portion formed on the cam bracket intersecting the path of movement of the knobs and hence of the data tags thereon, and detent latching means cooperating with the guiding bar and the cam bracket to hold the latter in fixed relation to its adjusted position on the scale.

6. A business machine comprising a housing of elongated form disposed in horizontal position, an endless conveyor movably carried on horizontal axes in the housing, and thus having an upper and lower run operating horizontally from substantially one end of said housing to its other end, and means to actuate the endless conveyor; a cover on the front side of the housing and having a straight horizontal viewing edge disposed between the two horizontal runs of the conveyor, an elongated index strip mounted horizontally within the housing at the rear of the viewing edge alongside of and parallel with the lower run of the conveyor, a time indicating scale provided on the index strip, supporting means on the conveyor for holding business data tags adapted to be manually placed detachably on the lower run thereof behind the scale, and means mounted in the housing for ejecting the data tags from said lower run after an elapsed time predetermined on the scale.

7. A business machine as described in claim 6—and in addition thereto the cover is mounted on the upper portion of the front side of the housing, the straight horizontal viewing edge is at the lower portion of the cover, and the cover thus conceals the upper run of the conveyor but leaves visible its lower run.

8. A business machine as described in claim 6—and wherein the elongated index strip has a lower edge which is horizontal and straight, said lower edge being disposed in front of the lower run of the conveyor and hence between the latter and the viewing edge of the cover, and the time indicating scale being provided along said lower edge.

9. A business machine as described in claim 6—and wherein the elongated index strip has a lower edge which is horizontal and straight, said lower edge being disposed in front of the lower run of the conveyor and hence between the latter and the viewing edge of the cover, the time indicating scale being provided along said lower edge, and an entry notch provided in the lower edge of the index strip, through which the business data tags are adapted to be inserted when manually placing them on the lower run of the conveyor.

10. A business machine as described in claim 6—and in addition thereto the elongated index strip is disposed in front of the lower run of the conveyor but is transparent and thus renders visible said lower run therebehind; and a luminous tube light mounted horizontally in the housing, above the viewing edge of the cover, also above the transparent index strip, and extending the full length of said lower run, which illuminates said transparent strip and the time indicating scale thereon.

11. A business machine as described in claim 6—and having an improvement thereover comprising two means for ejecting the data tags, one being disposed above the lower run and intermediate the ends of the time indicating scale, the other at the end of said scale; and the data tags formed in two sizes, one size being ejected intermediate the ends of the scale, and the other at the end thereof.

12. A business machine as described in claim 6—wherein the means therein recited for ejecting the data tags comprises a cam, a guiding bar mounted in the housing parallel to the elongated index strip, and said cam being mounted movably on the guiding bar for adjustment therealong in relation to the time indicating scale.

13. A business machine as described in claim 6—and wherein the means for ejecting the data tags comprises a cam bracket having an angular portion intersecting the line of travel of said data tags on the lower run of the conveyor, a horizontal guiding bar fixed in the housing adjacent and parallel to the lower run of the conveyor and on which the cam bracket is slidably mounted for adjustment therealong, and latching means formed on the guiding bar and the cam bracket to fix the latter in any chosen position along the time indicating scale.

14. A business machine as described in claim 6—but more specifically the endless conveyor consists of a link chain, the links of which are pivotally connected by pintles, and a tapered knob is formed axially on each pintle and constitutes the supporting means; and further characterized by making the ejecting means in the form of a stationary cam bracket which ejects the tags, the cam bracket being provided with a passage through which the knobs pass as the tags are ejected therefrom.

15. A business machine as described in claim 6—and wherein the time indicating scale consists of numerals 1, 2, 3, 4, 5, and so on, uniformly spaced apart to denote day periods on the elongated index strip; and the endless conveyor consists of a link chain, the links of which are equal in length to the spaced distance between the numerals; pintles pivotally connecting the chain links, with a knob formed axially on each and every pintle and extending outward from the front side of said chain, the knobs thus also being spaced uniformly apart a distance equal to said spaced distance between the numerals; and wherein the means to actuate the endless conveyor includes a step-by-step drive which is operatively connected with the endless chain for periodically advancing it in increments a distance also equal to the spacing of the numerals.

16. A business machine as described in claim 6—and wherein the time indicating scale consists of numerals 1, 2, 3, 4, 5, and so on, uniformly spaced apart to denote day periods on the elongated index strip; and the endless conveyor consists of a link chain, the links of which are equal in length to the spaced distance between the numerals; pintles pivotally connecting the chain links, with a knob formed axially on each and every pintle and extending outward from the front side of said chain, the knobs thus also being spaced uniformly apart a distance equal to said spaced distance between the numerals; and wherein the means to actuate the endless conveyor includes a step-by-step drive which is operatively connected with the endless chain for periodically advancing it in increments a distance also equal to the spacing of the numerals; and wherein also the means mounted in the housing for ejecting the data tags comprises a guiding bar disposed parallel with and adjacent the lower run of the endless chain and extends along the time indicating scale of numerals, the guiding bar having detent notches spaced apart uniformly the same spaced distance as between the numerals, a sleeve slidably mounted on the guiding bar, a cam having an angular portion intersecting the lower run and carried by the slidable sleeve and movable therewith, and a detent latch carried by the movable sleeve and cam and engaging the detent notches, whereby the cam is adjustable along the guiding bar to a selected position on the time indicating scale.

17. A business machine as described in claim 6—and wherein a mid-partition is disposed centrally and upright in the elongated housing, extends from end to end thereof, and from the lower part of the housing to near the upper part thereof, the upper portion of said mid-partition being defined by a straight horizontal edge extending from end to end of said housing and leaving a space between said edge and the upper part of said housing; a luminous tube mounted above the said edge and within said space, extending substantially from end to end of the housing, above and to the rear of the viewing edge of the cover, and spreading its illumination downward along the time indicating scale; and the endless conveyor, as well as the means to actuate it, also the elongated index strip, and the means for ejecting the data tags, all being mounted upon said mid-partition.

18. A business machine comprising a housing of elongated form disposed in horizontal position, an endless chain carried on sprocket wheels mounted on horizontal axles supported in the housing, and thus having an upper and lower chain run extending horizontally from end to end of the housing, and means periodically to actuate the endless chain in short advance steps; a cover disposed on the upper front portion of the housing and having a lower straight horizontal viewing edge disposed between the two horizontal runs of the chain, thereby concealing the upper run of said chain and leaving its lower run visible; an elongated index strip mounted horizontally within the housing and to the rear of the viewing edge of the cover, the index strip having a lower edge formed horizontally straight and disposed parallel with and in front of the lower horizontal run of the chain, a time indicating scale provided on the lower edge of the index strip and hence in front of and along the lower run of the chain and behind the viewing edge, inwardly tapering knobs on the chain and extending horizontally outward for carrying business data tags manually placed detachably on its lower run; and ejecting cam means mounted in the housing, adjacent the lower run of the chain, for ejecting the tags therefrom, after an elapsed time predetermined by the scale, upon periodic advance of the chain.

ROBERT W. HERSH.

REFERENCES CITED

The following references are of record in the file of this patent:

UNITED STATES PATENTS

| Number | Name | Date |
| --- | --- | --- |
| 1,207,737 | Fotheringham | Dec. 12, 1916 |
| 1,244,282 | Berthelote | Oct. 23, 1917 |
| 1,372,970 | McDonnell | Mar. 29, 1921 |
| 1,400,081 | La Roche | Dec. 13, 1921 |
| 2,099,281 | Shaw | Nov. 16, 1937 |

FOREIGN PATENTS

| Number | Country | Date |
| --- | --- | --- |
| 461,599 | Germany | June 23, 1928 |